United States Patent [19]
Garcia et al.

[11] Patent Number: 5,682,385
[45] Date of Patent: Oct. 28, 1997

[54] ENHANCEMENT FOR A MULTIPLEXING TELECOMMUNICATIONS INTERFACE

[75] Inventors: Frank X. Garcia; Donald Koch, both of Aurora, Ill.

[73] Assignee: Teltrend Inc., Charles, Ill.

[21] Appl. No.: 533,078

[22] Filed: Sep. 25, 1995

[51] Int. Cl.$^6$ .................................................. H04J 3/02
[52] U.S. Cl. ........................................ 370/458; 370/904
[58] Field of Search ............................. 370/85.1, 85.12,
370/94.1, 94.3, 95.1, 95.2, 95.3, 60, 60.1,
61, 241, 245, 247, 248, 251, 252, 254,
389, 401, 402, 405, 407, 408, 421, 423,
425, 522, 524, 904, 908, 916, 535, 537,
541, 264, 441, 443, 444, 447, 449–450,
458, 459, 461, 462; 379/93–96

[56] References Cited

U.S. PATENT DOCUMENTS 5,151,896  9/1992  Bowman et al. .................... 370/85.13

*Primary Examiner*—Douglas W. Olms
*Assistant Examiner*—Dang Ton
*Attorney, Agent, or Firm*—McDonnell Boehnen Hulbert & Berghoff

[57] ABSTRACT

A system for use by a multiplexing telecommunications interface that allows the interface to communicate with a larger variety of digital subscriber loop protocols, such as ISDN. For example, a remote terminal may include common equipment that allocates a limited bandwidth to particular channel cards. Such channel cards control the flow of information between a digital subscriber loop and a digital transmission facility. If the bandwidth allocated to a particular channel card is insufficient, a provisioning channel card may be used which will signal the common equipment that it exists and should be allocated to a bandwidth. However, the provisioning channel card will effectively provide its bandwidth to at least one other channel card, which will use the additional bandwidth to meet the requirements of a particular protocol, such as ISDN.

5 Claims, 4 Drawing Sheets

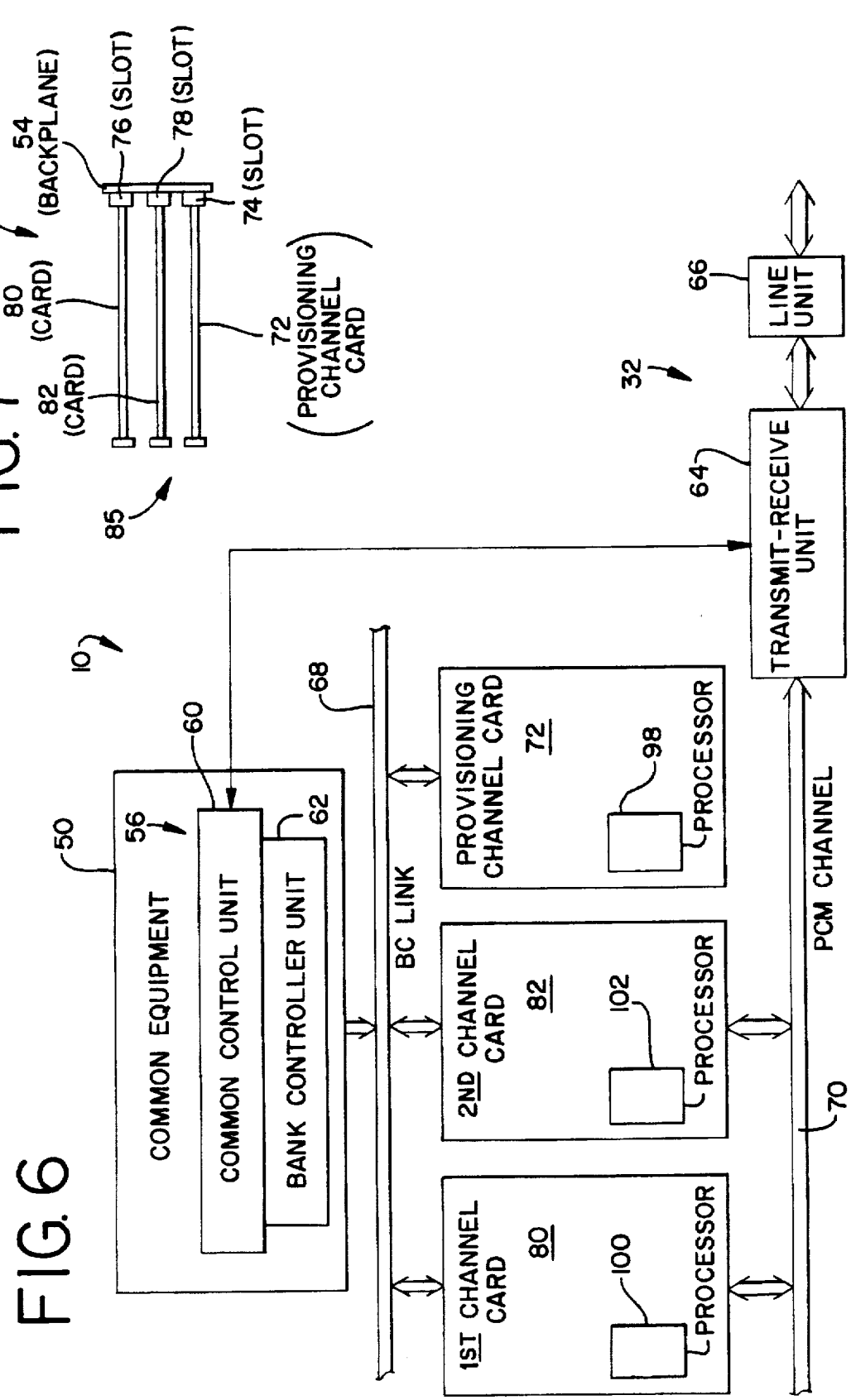

ENHANCEMENT FOR A MULTIPLEXING TELECOMMUNICATIONS INTERFACE

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to an interface for use in a telecommunications network. More particularly, the invention relates to an enhancement for a multiplexing telecommunication interface that allows the interface to more conveniently interconnect with a greater variety of other transmission systems, such as a Digital Subscriber Loop ("DSL") that utilizes an Integrated Services Digital Network ("ISDN") format.

Many digital telecommunication transmission facilities include a central office, which transmits data, or "payload," signals over digital transmission lines. The payload is sent by the central office, via transmission lines and a series of regenerative repeaters, to a digital subscriber loop and, thereafter, to the customer premises equipment. Conversely, payload is also sent from the customer premises equipment, via a digital subscriber loop and the transmission lines and repeaters, back to the central office.

The digital transmission lines, within the Bell telephone system in the United States, for example, often utilize Digital ("D") multiplexing pulse code modulation. A "D" channel bank, for example, commonly provides multiple DS-1 signals that are carried on a T-1 transmission system. Each T-1 line carries 24 full duplex channels on two pairs of exchange grade cables. One pair of cables is provided for each direction of transmission. For background information on digital transmission lines, see, for example, U.S. Pat. No. 5,224,149, the contents of which are incorporated herein by reference.

Different DSLs may utilize a variety of different formats to carry payload to and from the customer premises, such as, for example, POTS ("Plain Old Telephone Service") and SPOTS ("Special Plain Old Telephone Service"). An increasing number of customers, or subscribers, are requesting service in an ISDN format.

A digital transmission line and a variety of different DSLs may terminate at a remote terminal. The remote terminal demultiplexes the payload from the digital transmission line onto the different DSLs and, conversely, multiplexes payload from the different DSLs onto the digital transmission line. Similarly, the central office may include a terminal that functions, in many respects, like the remote terminal, in that it is a multiplexing and demultiplexing interface between a digital transmission line and a variety of other, lower-capacity, digital lines.

Many of the remote terminals or central office terminals include a common controller. The common controller effectively supervises the multiplexing and demultiplexing functions of the equipment.

Many of the presently existing terminals, such as AT&T's SLC-5®, "Digital Loop Carrier System," have common controllers that were designed before the demand for ISDN service was as it is now. Accordingly, many common controllers, without modification, are not configured to meet the special requirements for ISDN transmissions. In particular, DLCs carrying ISDN payload require B1, B2, and D service. A single DSL thus requires the allocation of three different payload channels.

Many common controllers are not configured to allow more than two payload channels to be allocated to a single DSL. Accordingly, up until now, without physically modifying the common controller of the terminal, it has proved difficult to have the common controller allocate B1, B2, and D channels to any one DSL. If a customer requested ISDN service, the telephone company often had to physically replace at least part of the common controller with a new unit that was specifically configured to allow a single DSL to utilize three different payload channels.

Thus, to accommodate the special demands of ISDN service, the telephone company was often required to undertake the expense and effort of purchasing and installing a new common controller for a terminal. This was substantially the case, even if only one customer serviced by the terminal had requested the ISDN service.

Moreover, the replacement of such a common controller often requires the physical removal of the existing printed circuit boards, or cards, physically adjusting, or "optioning," new cards, and installing the new cards. Such a procedure can take an technician an hour or more. Accordingly, the service normally provided by the terminal may be interrupted for a substantial period of time. Such an extended disruption of telephone service often provides substantial inconvenience to the telephone companies and their customers.

Thus, the costs of purchasing and installing new common controllers, as well as the interruption of telephone service to those who are exclusively serviced by the relevant terminal, can be a substantial annoyance. This is particularly true where new common controllers must be installed because only one customer (or a limited number of customers) served by the terminal have requested ISDN service.

SUMMARY OF THE INVENTION

In the principal aspect, the present invention is a provisioning channel card for telecommunications interface. The interface multiplexes digital data along a bus, such as a digital transmission facility. The interface includes common equipment, such as a common controller. The interface also includes a plurality of channel card slots for receiving channel cards, which transport payload to and from the digital transmission facility. The interface allocates a channel on the bus to a particular channel card, however, only upon sending a query to the particular card and responsively receiving the proper acknowledgement from the card.

The provisioning channel card includes a base that interconnects to one of the channel card slots in the telecommunications interface, as well as an acknowledger for receiving the query from the common equipment and responsively providing the proper acknowledgement. However, the provisioning channel card substantially utilizes none of the channel or time slots that are allocated to it by the common controller. Rather, it advises at least one or more other channel cards that the time slot or channel allocated to it by the common controller may be utilized by such other channel cards.

Thus, an object of the present invention is an improved channel provisioning card that allows interface equipment to interconnect more easily to a greater variety of Subscriber Loop ("SL") formats, such as ISDN. Another object is a provisioning card that allows a terminal to utilize a greater variety of SL formats, such as ISDN, without requiring substantial hardware modification of the common equipment or the disruption of the telephone service provided by the interface. Yet another objective is a more convenient and less expensive method of allowing interface terminals to offer ISDN service. These objects, features, and advantages of the present invention are discussed or are apparent in the following detailed description.

BRIEF DESCRIPTION OF THE DRAWINGS

A preferred embodiment of the present invention as described herein, with reference to the drawings wherein:

FIG. 6 is a schematic diagram showing three channel cards interconnected to the common equipment in the remote terminal shown in FIG. 2; and FIG. 7 is a top plan view of a tri-group of cards in the remote terminal shown in FIG. 2.

DETAILED DESCRIPTION OF THE PREFERRED EMBODIMENT

Figure 1:
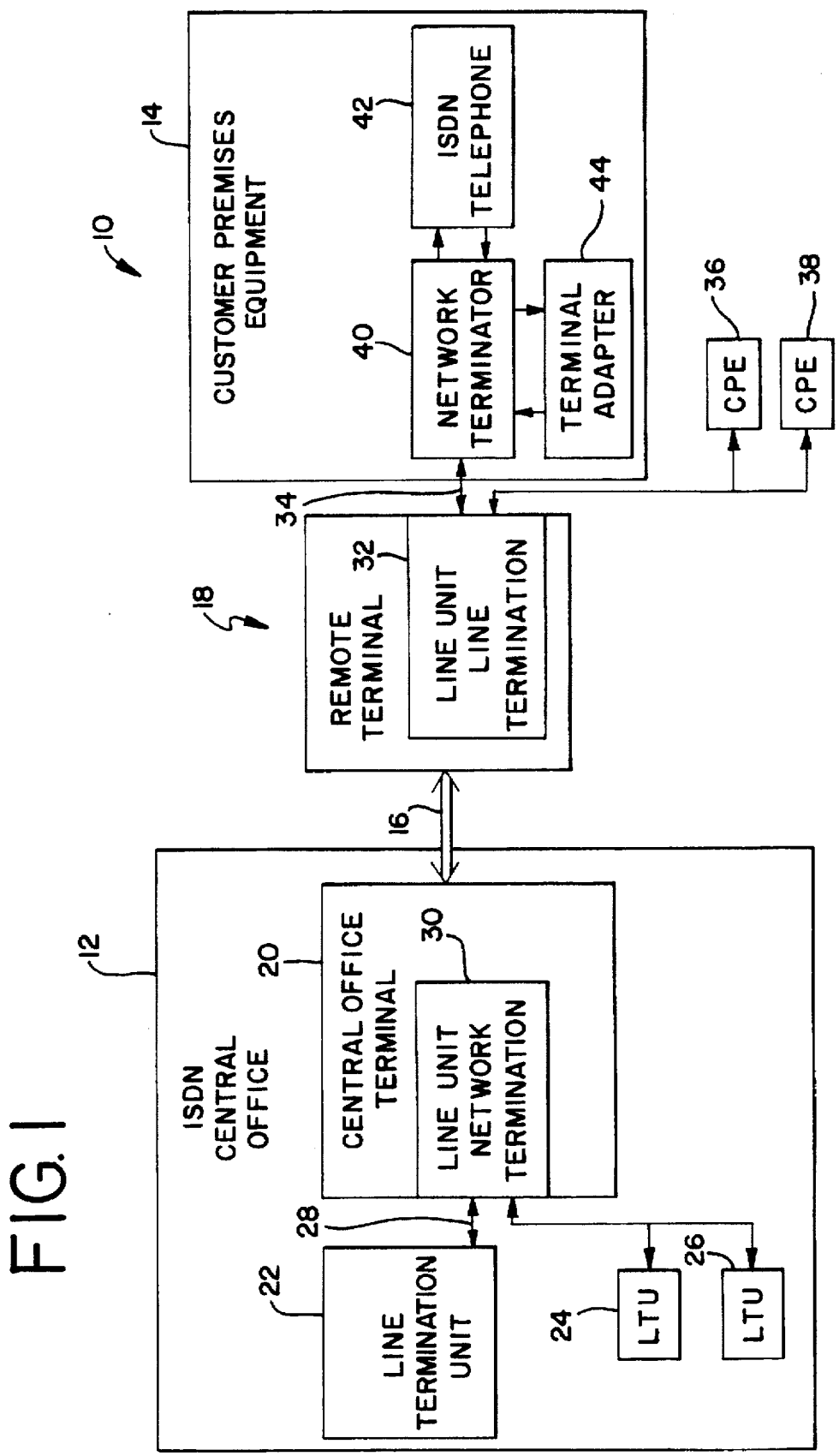
FIG. 1 is a block diagram of a preferred embodiment of the present invention, showing a telephone company central office interconnected to customer premises equipment.
Figure 2:
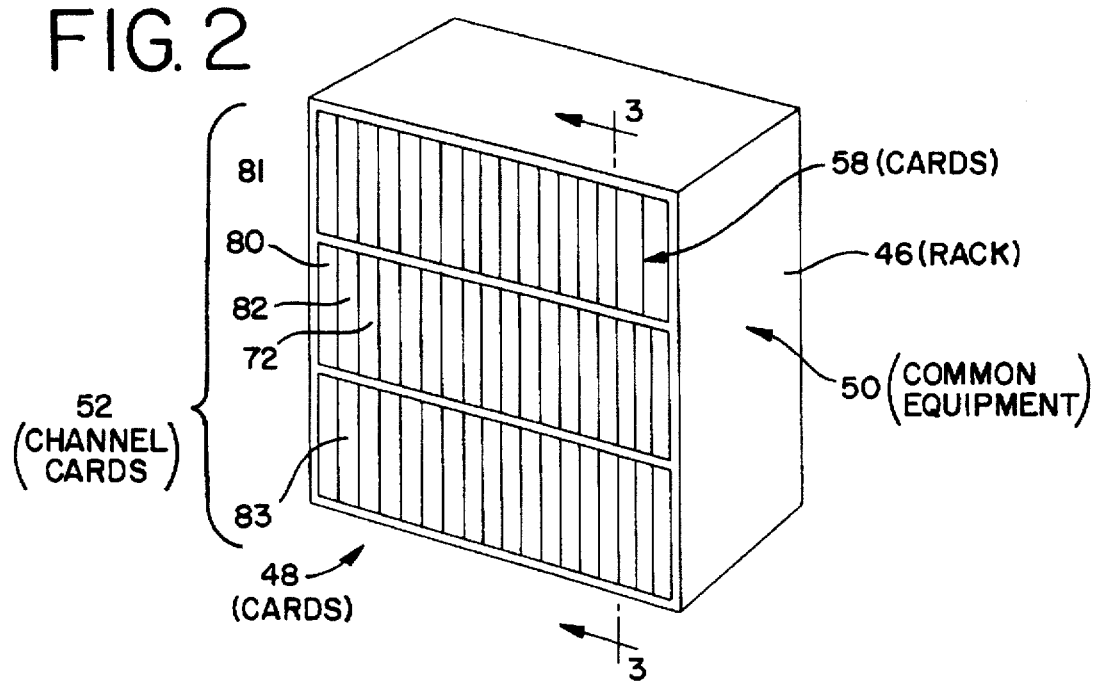
FIG. 2 is an isometric view of an exemplary remote terminal shown in FIG. 1.

Referring to FIGS. 1–7, the preferred embodiment is a system 10 for enhancing a multiplexing telecommunications interface. As shown in FIG. 1, the system 10 is utilized with an ISDN central office 12 interconnected to customer premises equipment 14 via a digital transmission facility 16 and remote terminal 18. The digital transmission facility 16 may include a four wire transmission system, such as a T1 line or another type of digital transmission line.

The ISDN central office 12 includes a central office terminal 20, as well as a variety of line termination units 22, 24, 26. The exemplary line termination unit 22 is interconnected to the central office terminal 20 via a digital line 28. The central office terminal 20 includes a line unit network termination 30.

The remote terminal 18 also includes a line unit line termination 32, which is interconnected to the customer premises equipment 14 via a subscriber loop ("SL") 34. Other customer premises equipment is also serviced by the remote terminal 18. In the preferred embodiment, the subscriber loop 34 is a Digital Subscriber Loop ("DSL"), carrying payload in an ISDN format.

For purposes of illustration only, the present system 10 is explained as it exists and operates in the remote terminal 18. It must be understood, of course, that the system 10 may also be used in the central office terminal 20.

The customer premises equipment 14, in the example shown in FIG. 1, includes an network terminator 40, which is an interface between the DSL 34 and both an ISDN telephone 42 and an ISDN terminal adaptor 44. The adaptor 44 allows different types of digital equipment, such as a personal computer, to communicate over the ISDN DSL 34.

There appears to be an increasing demand in the United States for DSLs that will support the ISDN format. The ISDN format generally requires, as known by those of ordinary skill in the art, B1, B2, and D+ channels, thus providing for transmission of data on two channels (B1 and B2) at 64 kilobits per second, and one channel (D+) at 16 kilobits per second, for a total payload transmission rate of 144 kilobits per second. An additional 16 kilobits of data per second may be utilized as overhead to control the transmission of data.

The remote terminal 18 demultiplexes data from a variety of to different channels onto the digital transmission facility 16 and multiplexes data from the digital transmission facility 16 to the different channels. One or two channels may be allocated to a particular SL interconnected to the remote terminal 18.

The remote terminal 18, as shown in FIGS. 2, 3, 6, and 7, includes a rack 46 for receiving a variety of cards 48 and common equipment 50. Such cards 48 include channel cards 52, which typically control the flow of payload between the digital transmission facility 16 and a particular DSL. The common equipment 50 includes a backplane 54, which allows communication between the cards 48, as well as a common controller 56 found on a series of cards 58. The common controller 56 supervises the operation of the channel cards 52 and includes a common control unit 60 and a bank controller unit 62.

The line unit line termination 32 in the remote terminal 18, which may be considered as part of the common equipment 50, includes a transmit-receive unit 64 and a line unit 66. The backplane 54 includes a Bank Controller link 68 and a Pulse Code Modulation ("PCM") channel or "bus" 70.

The bank controller unit 62 is an interface between the channel cards 52 and the common control unit 60, which regulates the operation of the channel cards 52. The bank controller unit 62 and channel cards 52 communicate to each other via the backplane 54.

Figure 3:
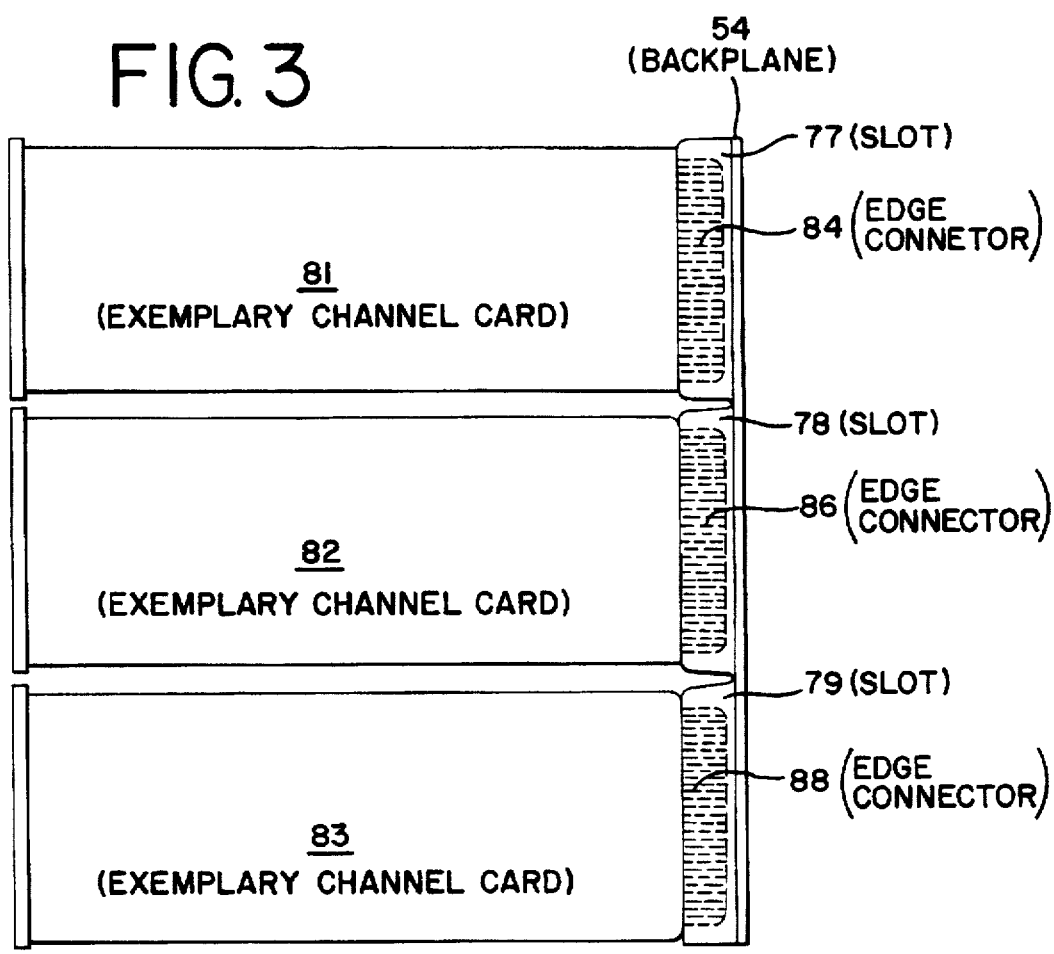
FIG. 3 is a diagram of a cross-sectional view of the remote terminal shown in FIG. 1, taken the along the line 3—3.

FIG. 3 demonstrates three exemplary channel cards 81, 82, 83 plugged into three channel card slots 77, 78, 79 via edge connectors 84, 86, 88. Accordingly, the backplane 54 allows communication between the cards 48, as shown in FIG. 6.

As discussed above, many bank controller units have hardware that is generally not designed to allow channel cards to communicate to the customer premises using ISDN format. The cards corresponding to such bank controller units must be physically removed from the remote terminal, and new bank controller cards must be optioned and put in the place of the old cards. This, of course, may cause an interruption of DSL service by all of the channel cards in the remote terminal that rely upon the bank controller unit in order to operate.

For example, the AT&T SLC-5® "Digital Loop Carrier System" has a variety of physical channel card slots, and each slot may be allocated two communication channels. In some applications, however, such as for an ISDN DSL, more than two channels must be allocated to a single, physical slot.

In addition to supervising the operation of the channel cards 52, the common controller 56 also ensures, for example, that if no channel unit card has been inserted into a particular slot, no communication channels will be allocate to that slot or any channel card associated with that slot. Typically, the bank controller unit 62 sends a query signal, via the bank control link 68, to each channel card slot. A proper channel card will receive the query and responsively provide an acknowledgment signal, via the bank controller link 68, to bank controller unit 62.

The common controller 56 may then allocate up to two channels to the particular slot and channel card that provided the proper acknowledgment signal. Generally, the channel card would then use the allocated channels to communicate, via the PCM channel, to the transmit-receive unit 64 and, thus, both the digital transmission facility 16 and the DSL 34.

The present system 10 allows such a remote terminal to offer ISDN services, without employing a common controller hardware upgrade. As shown in FIGS. 6 and 7, with the system 10, a provisioning channel card 72 is plugged into a slot 74 in the remote terminal 18 that is immediately to the right of two other, conventional channel card slots 76, 78. The slots 76, 78 are interconnected to conventional ISDN channel cards 80, 82, which communicate with both the bank control link 68 and PCM channel 70.

Most conventional channel cards interact with both the PCM channel or "bus" 70 and the bank control link 68. In the preferred system 10, however, the provisioning channel card 72 only interacts with the bank control link 68 (and bank controller unit 62). The bank controller unit 62 provides a query to the provisioning channel card 72 and receives a proper acknowledgment signal that the card 72 is a POTS card, requiring two communication channels. The bank controller unit 62 is satisfied that the card 72 is a proper channel card in the slot 74 and allocates two channels to the card 72. The card 72, however, substantially does not use the two channels allocated to it. Rather, these channels may be used by one or more of the other cards 80, 82.

Figure 4:
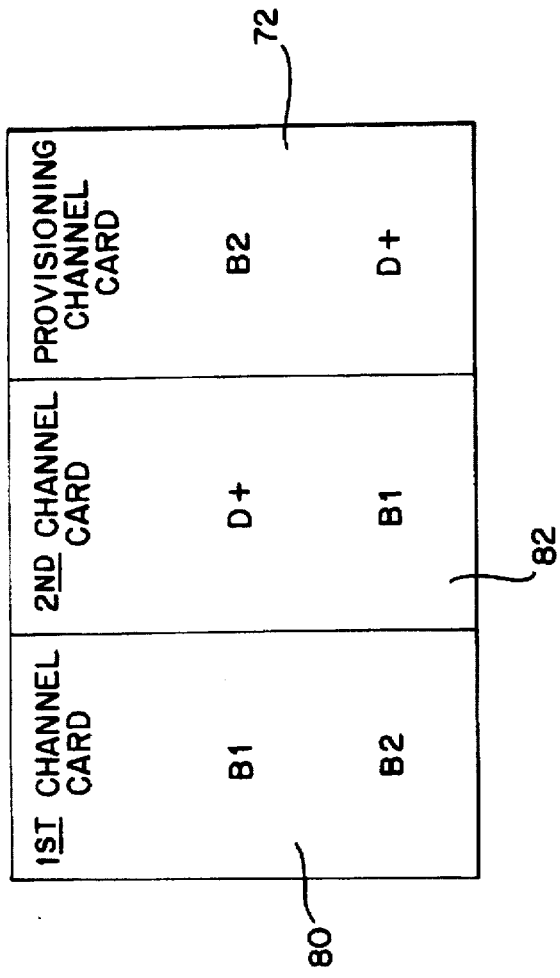
FIG. 4 is a diagram showing an allocation of communication channels among three channel cards in the remote terminal shown in FIG. 2.

With the exemplary system 10, the three channel cards 72, 80, 82 may be considered as a tri-group 85: the two left-most cards 80, 82 ("first and second cards") are ISDN channel cards; the card on the right of the tri-group 84 is the provisioning channel card 72. As shown in FIGS. 4 and 6, the provisioning channel card does not use allocated channels. In the example shown in FIG. 4, the first channel card 80 utilizes the two channels allocated to it (for B1 and B2) and one of the two channels allocated to the second channel card 82 (for D+). The second channel card 82 utilizes one of the two channels allocated to it (for B1) and the two channels allocated to the provisioning channel card 72 (for B2 and D+). The provisioning channel card 72 may advise the other two channel cards 80, 82 in the tri-group 85 that its channel allocation is available to them.

Thus, contrary to common practice in the field, a channel card 72 is inserted into the remote terminal 18, the channel card 72 provides an acknowledgment to the common controller 56 in the common equipment 50 that it exists, but the channel card 72 provides substantially no payload to the communication channels allocated to it by the common controller 56. In effect, the channel card 72 "spoofs" the common controller 56 into effectively believing that it is, for example, a POTS card. Rather than actually using the channel or bandwidth allocated to it by the common controller 56, the card effectively "gives" the bandwidth allocated to it to the other cards 80, 82 in its tri-group 85, so that they may communicate to the customer premises equipment 14 using, for example, an ISDN format.

Consequently, a technician does not need to option and replace some of the cards 58 that make up the common controller 56 with other cards that are designed to accommodate ISDN service. This is particularly welcome where only a small percentage of the channel cards 52 in the remote terminal 18 need to provide ISDN service. Thus, the telephone service for a substantial number of customers need not be cut off in order to provide ISDN service to those who request it.

Figure 5:
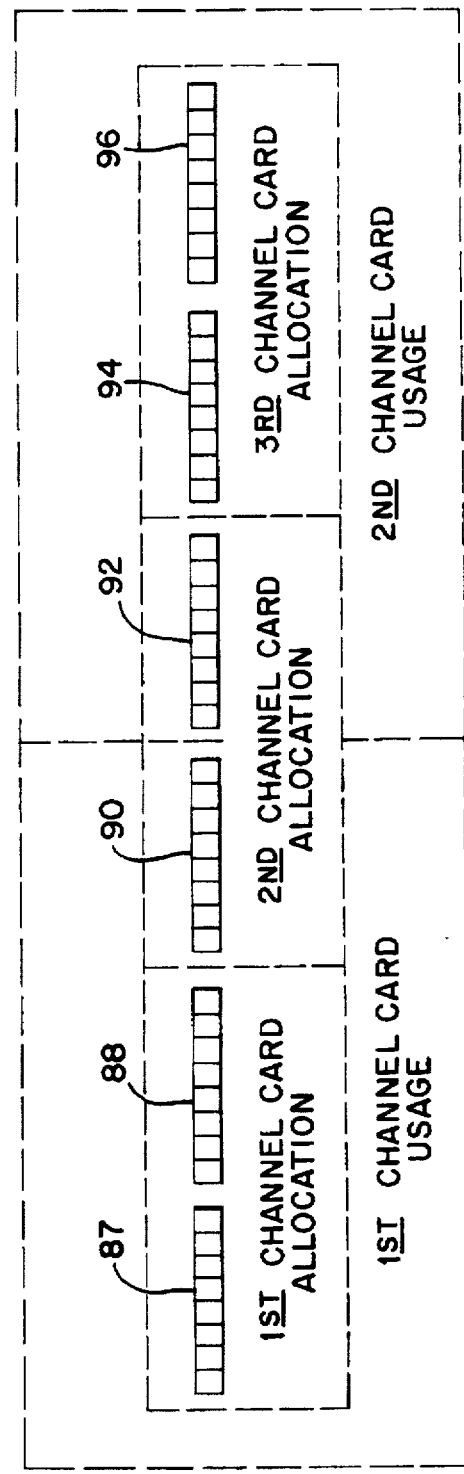
FIG. 5 is a more detailed diagram showing an allocation of payload among three channel cards in the remote terminal shown in FIG. 2.

As shown in FIG. 5, the common controller 56 allocates two 8-bit segments of payload to each of the three cards 72, 80, 82 in the tri-group 85. These are represented by the segments 87, 88, 90, 92, 94, 96. The first and second channel cards 80, 82, however, each utilize three segments, or 24 payload bits, since the provisioning channel card 72 does not transfer payload.

Each of the three channel cards 72, 80, 82 include a processor 98, 100, 102. In the preferred embodiment, each is an Intel 8031 processor. The processors 98–102 provide messages to and from the common controller 56, so that the allocation of payload may be accomplished as previously described. Software routines employed by each of the processors 98–102 to identify themselves to the common controller 56 are shown below.

Although the forgoing description of the preferred embodiment will enable a person of ordinary skill in the art to make and use the same, the following detailed source code listing for the processors is included. The listing provides detailed information concerning the programming and the operation of the overall system. Additional detailed features of the system will become apparent to those of ordinary skill in the art from reviewing the program.

```
$registerbank   (3)                ;for back plane message
                USING  3           ;reg bank 2
;***********************************************************/
;amsghlr.asm(AUA93 BRIGHT UNIT)                              */
;**********************************************************
;          MESSAGE HANDLER ROUTINE                           *
;**********************************************************
;AMSGPRO : Application message processing will be called from core message   *
;interrupt routine. The application message handler is responsible for analyzing *
;and responding to the Bank Control Unit as quickly as the code could be  *
;written. Timing is important. (The channel unit has approximately about 64 ns to *
;to analyze and to response message activities.)                              *
;**********************************************************
;DATA SEGMENT
                ISEG
WBCLMOD     EQU    02H       ;EXTERNAL WRITE BCL MODE REGISTER
WBCLDTA     EQU    03H       ;EXTERNAL WRITE BCL DATA REGISTER
WADDR04     EQU    04H       ;EXTERNAL WRITE ADDRESS 04
BCLADDR     EQU    01H       ;EXTERNAL BCL ADDRESS REGISTER
RBCLMOD     EQU    02H       ;EXTERNAL READ BCL MODE ADDRESS
RBCLDTA     EQU    03H       ;EXTERNAL READ BCL MODE DATA
A_XMT_SIG   EQU    04H       ;EXTERNAL XMT SIGNALLING FOR CHANNEL A
AUA93       EQU    0B2H      ;AUA93 CARD ID
AUA92       EQU    0B1H      ;AUA92 CARD ID
AUA59       EQU    081H      ;AUA59 CARD ID
AUA39_ID    EQU    83H       ;AUA39 CARD ID
;**********************************************************
;EXTERN REFERRENCE
;**********************************************************
;$ INCLUDE (aasmblr.h)
EXTRN DATA (BCLMODE,DATA00,DATA04,DATA05,DATA06,DATA01)
EXTRN BIT  (data00_0,data00_1,data00_2,data00_7,TALK_MODE)
extrn bit (A_TEST_ON,B_TEST_ON,DATA04_7,DATA04_6,BKUP_MSGENA, card_type);
                  ;/*NEW STUFF*/
EXTRN DATA (DATA06_BCL)
EXTRN BIT  (DATA04_0,DATA04_1)
;**********************************************************
;INTERN DECLARATION
PUBLIC  AMSGPRO
;**********************************************************
          name      slc5_message_routines
MESSAGE             segment      code
          cseg      at     013h           ;external-1 interrupt vector
          jmp       AMSGPRO
          rseg      MESSAGE               ;start of code
AMSGPRO:
          push      psw                   ;save registers
          push      acc
msg_int_fast:
```

```
                push    dph
                push    dpl
                setb    rs0                     ;switch to reg bank 3
                setb    rs1                     ;switch to reg bank 3
SPECIAL_PACKAGE:                                ;GO FOR SPECIAL PACKAGE
;       JNB     card_type,S59_AMSGPRO           ;GO FOR 59 MESSAGE HANDLER
;       LJMP    S39_AMSGPRO                     ;GO FOR 39 MESSAGE HANDLER
;****************************************************************/
/
;amsghlr.asm(AUA59 SPOT)                                         */
;****************************************************************
;               MESSAGE HANDLER ROUTINE                          *
;****************************************************************
*
S59_AMSGPRO:
        MOV     R0,#BCLADDR     ;POINT TO BCL DATA ADDRESS
        MOVX    A,@R0           ;GET NEW DATA
SCHECK1:
        ANL     A,#7EH          ;MASK UNUSED BITS
        MOV     DPTR,#SJMPTBL   ;SET UP THE JMP TABLE
        JMP     @A+DPTR         ;JUMP TO THE REQUIRED ENTRY
;
SR_ADDR0:
        MOV     R1,DATA00       ;GET DATA AT THE ADDR 00
SR_COMMON:
        INC     R0              ;POINT TO BCL MODE ADDRESS BYTE
        INC     R0              ;POINT TO BCL ADDRESS MODE
        MOV     A,R1            ;LOAD OLD DATA BACK
        MOVX    @R0,A           ;WRITE IT OUT
        AJMP    UPDBCL
SR_ADDR1:
        MOV     R1,DATA01       ;LOAD DATA01 IN R1
        SJMP    SR_COMMON       ;GO AND WRITE IT OUT
SR_ADDR3:
        MOV     R1,#AUA59
        SJMP    SR_COMMON       ;GO AND WRITE IT OUT
SR_ADDR4:
        MOV     A,DATA04        ;LOAD DATA04 IN ACC
        ANL     A,#0F0H         ;KEEP ONLY HIGH NIBLLE BITS
        MOV     R1,A            ;LOAD THE DATA BACK IN R1
        SJMP    SR_COMMON       ;GO AND WRITE IT OUT
SR_ADDR5:
        MOV     R1,DATA05       ;LOAD DATA05 IN R1
        SJMP    SR_COMMON       ;GO AND WRITE IT OUT
SRUNUJMP:JMP    SRUNUSED
SJMPTBL:
        SJMP            SR_ADDR0
        SJMP            SR_ADDR1
        SJMP            SR_ADDR2
```

```
        SJMP    SR_ADDR3
        SJMP    SR_ADDR4
        SJMP    SR_ADDR5
        SJMP    SR_ADDR6
 5      SJMP    SR_ADDR7
        SJMP    SR_ADDR8
        SJMP    SR_ADDR9
        SJMP    SR_ADDR0A
        SJMP    SR_ADDR0B
10      SJMP    SR_ADDR0C
        SJMP    SR_ADDR0D
        SJMP    SR_ADDR0E
        SJMP    SR_ADDR0F
        SJMP    SR_ADDR10
15      SJMP    SR_ADDR11
        SJMP    SR_ADDR12
        SJMP    SR_ADDR13
        SJMP    SR_ADDR14
        SJMP    SR_ADDR15
20      SJMP    SR_ADDR16
        SJMP    SR_ADDR17
        SJMP    SR_ADDR18
        SJMP    SR_ADDR19
        SJMP    SR_ADDR1A
25      SJMP    SR_ADDR1B
        SJMP    SR_ADDR1C
        SJMP    SR_ADDR1D
        SJMP    SR_ADDR1E
        SJMP    SR_ADDR1F
30      SJMP    SW_ADDR0
        SJMP    SW_ADDR1
        SJMP    SW_ADDR2
        SJMP    SW_ADDR3
        SJMP    SW_ADDR4
35      SJMP    SW_ADDR5
        SJMP    SW_ADDR6
        SJMP    SW_ADDR7
        SJMP    SW_ADDR8
        SJMP    SW_ADDR9
40      SJMP    SW_ADDR0A
        SJMP    SW_ADDR0B
        SJMP    SW_ADDR0C
        SJMP    SW_ADDR0D
        SJMP    SW_ADDR0E
45      SJMP    SW_ADDR0F
        SJMP    SW_ADDR10
        SJMP    SW_ADDR11
        SJMP    SW_ADDR12
        SJMP    SW_ADDR13
```

```
           SJMP      SW_ADDR14
           SJMP      SW_ADDR15
           SJMP      SW_ADDR16
           SJMP      SW_ADDR17
    5      SJMP      SW_ADDR18
           SJMP      SW_ADDR19
           SJMP      SW_ADDR1A
           SJMP      SW_ADDR1B
           SJMP      SW_ADDR1C
   10      SJMP      SW_ADDR1D
           SJMP      SW_ADDR1E
           SJMP      SW_ADDR1F
       SR_ADDR2:
       SR_ADDR6:
   15  SR_ADDR7:
       SR_ADDR8:
       SR_ADDR9:
       SR_ADDR0A:
       SR_ADDR0B:
   20  SR_ADDR0C:
       SR_ADDR0D:
       SR_ADDR0E:
       SR_ADDR0F:
       SR_ADDR10:
   25  SR_ADDR11:
       SR_ADDR12:
       SR_ADDR13:
       SR_ADDR14:
       SR_ADDR15:
   30  SR_ADDR16:
       SR_ADDR17:
       SR_ADDR18:
       SR_ADDR19:
       SR_ADDR1A:
   35  SR_ADDR1B:
       SR_ADDR1C:
       SR_ADDR1D:
       SR_ADDR1E:
       SR_ADDR1F:
   40  SRUNUSED:
           MOV       R1,#00            ;SET UP TO WRITE OUT 00
           AJMP      SR_COMMON         ;GO AND WRITE IT OUT
       SW_ADDR0:
           AJMP      SW_TADDR0         ;ELIMINATE PAGE BOUNDARY PROBLEM
   45  SW_ADDR2:
       SW_ADDR3:
       SW_ADDR6:
       SW_ADDR7:
       SW_ADDR8:
```

```
        SW_ADDR9:
        SW_ADDR0A:
        SW_ADDR0B:
        SW_ADDR0C:
        SW_ADDR0D:
        SW_ADDR0E:
        SW_ADDR0F:
        SW_ADDR10:
        SW_ADDR11:
        SW_ADDR12:
        SW_ADDR13:
        SW_ADDR14:
        SW_ADDR15:
        SW_ADDR16:
        SW_ADDR17:
        SW_ADDR18:
        SW_ADDR19:
        SW_ADDR1A:
        SW_ADDR1B:
        SW_ADDR1C:
        SW_ADDR1D:
        SW_ADDR1E:
        SW_ADDR1F:
        msg_ret:
            pop     dpl                     ;restore register
            pop     dph                     ;restore register
            pop     acc                     ;restore register
            pop     psw
            reti
        SW_ADDR1:
            MOV     R1,#DATA01              ;R0 POINTS TO DATA01 BYTE ADDRESS
        SW_COMMON1:
            JNB     DATA00_1,SW_ISDONE      ;GO WRITE IS DONE ROUTINE
        SW_COMMON2:
            JNB     TALK_MODE,SW_ISDONE     ;MAKE SURE TALK MODE IS SET
            INC     R0                      ;GET THE BCLMODE BYTE ADDRESS
            MOVX    A,@R0                   ;GET ITS CONTENT
            INC     R0                      ;GET THE DATA BYTE
            JB      ACC.2,MBITSET           ;CHECK FOR MBIT SET
                                            ;MBIT IS NOT SET
            MOVX    A,@R0                   ;GET DATA BYTE
            CPL     A                       ;COMPLEMENT IT
            ANL     A,@R1                   ;ANL WITH THE OLD DATA
            MOV     @R1,A                   ;SAVE IT BACK
            jmp     msg_ret                 ;return from message routine
        MBITSET:
            MOVX    A,@R0                   ;GET DATA BYTE
            ORL     A,@R1                   ;ANL WITH THE OLD DATA
            MOV     @R1,A                   ;SAVE IT BACK
```

```
SW_ISDONE:
        jmp     msg_ret                 ;return from message routine
SW_ADDR4:
        MOV     R1,#DATA04              ;R1 POINTS TO DATA04 BYTE ADDRESS
        SJMP    SW_COMMON2              ;GO FOR COMMON WRITE ROUTINE
SW_ADDR5:
        MOV     R1,#DATA05              ;R1 POINTS TO DATA05 BYTE ADDRESS
        SJMP    SW_COMMON2              ;GO FOR COMMON WRITE ROUTINE
        jmp     msg_ret                 ;return from message routine
SW_TADDR0:                              ;WRITE TO ADDRESS 00 ROUTINE
        MOV     R0,#RBCLDTA
        MOVX    A,@R0
        MOV     R1,A                    ;SAVE THE DATA IN R1 FOR LATER USE
        Jb      acc.7,SW_HBITS
        JB      ACC.6,SW_HBITS
        JB      ACC.5,SW_HBITS
        JB      ACC.4,SW_HBITS
SW_LBITS:
        JBC     BKUP_MSGENA,SW_DIALOG   ;CHECK FOR SOFTWARE MESSAGE ENABLE
        JB      DATA00_1,SW_DIALOG      ;CHECK FOR MESSAGE ENABLE
                                        ;COME HERE MESSAGE BIT IS NOT ENABLE
        MOV     A,R1                    ;GET THE DATA BACK
        ANL     A,#02H                  ;KEEP ONLY MSGENA BIT
SW_DIALOG:                              ;WRITE DIALOG BIT
        MOV     R1,A                    ;LOAD THE READ DATA IN R1
        DEC     R0                      ;GET BCLMODE BYTE ADDRESS
        MOVX    A,@R0                   ;GET ITS CONTENTS
        MOV     R0,#DATA00              ;R0 POINT TO DATA00 BYTE ADDRESS
        JB      ACC.2,MBITSET0          ;CHECK FOR MBIT IS SET
                                        ;COME HERE MBIT IS NOT SET
        JNB     DATA00_1,SW_ISDONE      ;GO WRITE IS DONE ROUTINE
        MOV     A,R1                    ;GET THE DATA BACK
        CPL     A                       ;COMPLEMENT IT
        ANL     A,@R0                   ;AND WITH THE OLD DATA
        MOV     @R0,A                   ;SAVE IT BACK
        SJMP    MFIXUP                  ;GO TO MESSAGE FIXED UP
                                        ;COME HERE MBIT IS SET
MBITSET0:
        MOV     A,R1                    ;GET THE NEW DATA BACK
        JB      ACC.0,CLEASR_BIT_1      ;IF BIT 0 AND 1 ARE SET,1 MUST CLEAR
        SJMP    MBITSET1                ;IF NOT,KEEP GOING
CLEASR_BIT_1:
        CLR     DATA00_1                ;CLEAR BIT1,PROTOCOL REQUIRED
        CLR     ACC.1                   ;CLER ALSO COMMING BIT 1
        SETB    BKUP_MSGENA             ;SET UP BACK UP MESSAGE ENABLE
MBITSET1:
        ORL     A,@R0                   ;ORL WITH THE OLD DATA
        MOV     @R0,A                   ;SAVE IT BACK
MFIXUP:
```

```
        MOV     A,#0C0H             ;SET SERVICE AND BCL_ENA BIT TO 1
        MOV     C,DATA00_0          ;LOAD IMAGE OF SERVICE BIT IN CARRY
        MOV     ACC.7,C             ;UPDATE SERVICE BIT
        MOV     BCLMODE,A           ;UPDATE INTERNAL BCLMODE BYTE
        MOV     R0,#WBCLMOD         ;POINT TO EXTERNAL BCL MODE BYTE ADDR
        MOVX    @R0,A               ;GO AND UPDATE
        JB      DATA00_0,RRET
        SETB    TALK_MODE
        MOV     R1,#12H             ;R1 POINTS TO NEW CH A XMT SIG
        MOV     A,#0C0H             ;SET UP A XMT SIG(COPY FROM ATT UNIT)
        MOVX    @R1,A               ;SEND DEFAULT A XMT SIG
        INC     R1                  ;POINT TO CH B XMT SIG
        MOVX    @R1,A               ; AND UPDATE IT TOO
        INC     R1                  ;POINT TO CH C XMT SIG
        MOVX    @R1,A               ; AND UPDATE IT TOO
        INC     R1                  ;POINT TO CH D XMT SIG
        MOVX    @R1,A               ; AND UPDATE IT TOO
RRET:
        jmp     msg_ret             ;return from message routine
SW_HBITS:                           ;GO FOR WRITE HIGH BIT ROUTINE
        mov     r2,a                ;save data in r2
        MOV     R1,#DATA00          ;R1 POINTS TO DATA00 BYTE ADDRESS
        DEC     R0                  ;GET THE BCLMODE BYTE ADDRESS
        MOVX    A,@R0               ;GET ITS CONTENT
        INC     R0                  ;GET THE DATA BYTE
        JB      ACC.2,BITSET        ;CHECK FOR MBIT SET
                                    ;BITCLEAR ROUTINE
        MOV     A,R2                ;LOAD THE DATA BACK
        JNB     ACC.7,BCHECK        ;
        MOV     C,A_TEST_ON
        ANL     C,DATA04_7
        JC      DATAOK
        JB      A_TEST_ON,NOWRITE   ;
        JNB     DATA04_7,NOWRITE    ;
        AJMP    DATAOK              ;GO FOR DATA OK
BCHECK:
        MOV     C,B_TEST_ON
        ANL     C,DATA04_6
        JC      DATAOK
        JNB     ACC.6,NOWRITE
        JB      B_TEST_ON,NOWRITE   ;
        JNB     DATA04_6,NOWRITE    ;
DATAOK:
        MOV     A,R2
        CPL     A                   ;COMPLEMENT IT
        ANL     A,@R1               ;ANL WITH THE OLD DATA
        MOV     @R1,A               ;SAVE IT BACK
        SJMP    UPDBCL
BITSET:                             ;BIT SET ROUTINE
```

```
                MOV     A,R2                ;GET DATA BYTE
                ORL     A,@R1               ;ANL WITH THE OLD DATA
                ANL     A,#0F2H             ;MASK BIT 2,3
                MOV     @R1,A               ;SAVE IT BACK
 5              SJMP    UPDBCL
        NOWRITE:
                JB      ACC.5,DATAOK
                JB      ACC.4,DATAOK
                jmp     msg_ret             ;return from message routine
10      ;WARNING:  DO NOT MAKE INSERT HERE -- FALLING ROUTINE
        UPDBCL:
                MOV     A,DATA00            ;SET SERVICE AND BCL_ENA BIT TO 1
                ANL     A,#0F1H
                CLR     C
15              JZ      UPDBCL1
                SETB    C
        UPDBCL1:
                MOV     A,BCLMODE           ;UPDATE INTERNAL BCLMODE BYTE
                ORL     C,DATA00_0          ;LOAD IMAGE OF SERVICE BIT IN CARRY
20              MOV     ACC.7,C             ;UPDATE SERVICE BIT
                jb      data00_2,lee
                SETB    ACC.6               ;SET OR RESET NSR
                MOV     R0,#WBCLMOD         ;POINT TO EXTERNAL BCL MODE BYTE ADDR
                MOVX    @R0,A               ;GO AND UPDATE
25      lee:
                jmp     msg_ret             ;return from message routine
        ;/***************************************************************/
        ;/*amsghlr.sm
         */
30      ;****************************************************************
        ;                   MESSAGE HANDLER ROUTINE                      *
        ;****************************************************************
        *
        S39_AMSGPRO:
35              MOV     R0,#BCLADDR         ;POINT TO BCL DATA ADDRESS
                MOVX    A,@R0               ;GET NEW DATA
        S39_CHECK1:
                ANL     A,#7EH              ;MASK UNUSED BITS
                MOV     DPTR,#S39_JMPTBL    ;SET UP THE JMP TABLE
40              JMP     @A+DPTR             ;JUMP TO THE REQUIRED ENTRY
        ;
        S39R_ADDR0:
                MOV     R1,DATA00           ;GET DATA AT THE ADDR 00
        S39R_COMMON:
45              INC     R0                  ;POINT TO BCL MODE ADDRESS BYTE
                INC     R0                  ;POINT TO BCL ADDRESS MODE
                MOV     A,R1                ;LOAD OLD DATA BACK
                MOVX    @R0,A               ;WRITE IT OUT
                AJMP    S39_UPDBCL
```

```
S39R_ADDR1:
        MOV     R1,DATA01           ;LOAD DATA01 IN R1
        SJMP    S39R_COMMON         ;GO AND WRITE IT OUT
S39R_ADDR3:
        MOV     R1,#AUA39_ID
        SJMP    S39R_COMMON         ;GO AND WRITE IT OUT
S39R_ADDR4:
        MOV     A,DATA04            ;LOAD DATA04 IN ACC
        ANL     A,#0F0H             ;KEEP ONLY HIGH NIBLLE BITS
        MOV     R1,A                ;LOAD THE DATA BACK IN R1
        SJMP    S39R_COMMON         ;GO AND WRITE IT OUT
S39R_ADDR5:
        MOV     R1,DATA05           ;LOAD DATA05 IN R1
        SJMP    S39R_COMMON         ;GO AND WRITE IT OUT
S39_JMPTBL:
        SJMP    S39R_ADDR0
        SJMP    S39R_ADDR1
        SJMP    S39R_ADDR2
        SJMP    S39R_ADDR3
        SJMP    S39R_ADDR4
        SJMP    S39R_ADDR5
        SJMP    S39R_ADDR6
        SJMP    S39R_ADDR7
        SJMP    S39R_ADDR8
        SJMP    S39R_ADDR9
        SJMP    S39R_ADDR0A
        SJMP    S39R_ADDR0B
        SJMP    S39R_ADDR0C
        SJMP    S39R_ADDR0D
        SJMP    S39R_ADDR0E
        SJMP    S39R_ADDR0F
        SJMP    S39R_ADDR10
        SJMP    S39R_ADDR11
        SJMP    S39R_ADDR12
        SJMP    S39R_ADDR13
        SJMP    S39R_ADDR14
        SJMP    S39R_ADDR15
        SJMP    S39R_ADDR16
        SJMP    S39R_ADDR17
        SJMP    S39R_ADDR18
        SJMP    S39R_ADDR19
        SJMP    S39R_ADDR1A
        SJMP    S39R_ADDR1B
        SJMP    S39R_ADDR1C
        SJMP    S39R_ADDR1D
        SJMP    S39R_ADDR1E
        SJMP    S39R_ADDR1F
        SJMP    S39W_ADDR0
        SJMP    S39W_ADDR1
```

BANNER & ALLEGRETTI, LTD.
10 South Wacker Drive
Chicago, Illinois 60606
Telephone (312) 715-1000

```
        SJMP    S39W_ADDR2
        SJMP    S39W_ADDR3
        SJMP    S39W_ADDR4
        SJMP    S39W_ADDR5
        SJMP    S39W_ADDR6
        SJMP    S39W_ADDR7
        SJMP    S39W_ADDR8
        SJMP    S39W_ADDR9
        SJMP    S39W_ADDR0A
        SJMP    S39W_ADDR0B
        SJMP    S39W_ADDR0C
        SJMP    S39W_ADDR0D
        SJMP    S39W_ADDR0E
        SJMP    S39W_ADDR0F
        SJMP    S39W_ADDR10
        SJMP    S39W_ADDR11
        SJMP    S39W_ADDR12
        SJMP    S39W_ADDR13
        SJMP    S39W_ADDR14
        SJMP    S39W_ADDR15
        SJMP    S39W_ADDR16
        SJMP    S39W_ADDR17
        SJMP    S39W_ADDR18
        SJMP    S39W_ADDR19
        SJMP    S39W_ADDR1A
        SJMP    S39W_ADDR1B
        SJMP    S39W_ADDR1C
        SJMP    S39W_ADDR1D
        SJMP    S39W_ADDR1E
        SJMP    S39W_ADDR1F
S39R_ADDR2:
S39R_ADDR6:
S39R_ADDR7:
S39R_ADDR8:
S39R_ADDR9:
S39R_ADDR0A:
S39R_ADDR0B:
S39R_ADDR0C:
S39R_ADDR0D:
S39R_ADDR0E:
S39R_ADDR0F:
S39R_ADDR10:
S39R_ADDR11:
S39R_ADDR12:
S39R_ADDR13:
S39R_ADDR14:
S39R_ADDR15:
S39R_ADDR16:
S39R_ADDR17:
```

```
         S39R_ADDR18:
         S39R_ADDR19:
         S39R_ADDR1A:
         S39R_ADDR1B:
   5     S39R_ADDR1C:
         S39R_ADDR1D:
         S39R_ADDR1E:
         S39R_ADDR1F:
                 MOV     R1,#00              ;SET UP TO WRITE OUT 00
  10             AJMP    S39R_COMMON         ;GO AND WRITE IT OUT
         S39W_ADDR0:
                 AJMP    S39W_TADDR0         ;ELIMINATE PAGE BOUNDARY PROBLEM
         S39W_ADDR2:
         S39W_ADDR3:
  15     S39W_ADDR6:
         S39W_ADDR7:
         S39W_ADDR8:
         S39W_ADDR9:
         S39W_ADDR0A:
  20     S39W_ADDR0B:
         S39W_ADDR0C:
         S39W_ADDR0D:
         S39W_ADDR0E:
         S39W_ADDR0F:
  25     S39W_ADDR10:
         S39W_ADDR11:
         S39W_ADDR12:
         S39W_ADDR13:
         S39W_ADDR14:
  30     S39W_ADDR15:
         S39W_ADDR16:
         S39W_ADDR17:
         S39W_ADDR18:
         S39W_ADDR19:
  35     S39W_ADDR1A:
         S39W_ADDR1B:
         S39W_ADDR1C:
         S39W_ADDR1D:
         S39W_ADDR1E:
  40     S39W_ADDR1F:
                 jmp     msg_ret             ;return from message routine S39W_ADDR1:
                 MOV     R1,#DATA01          ;R0 POINTS TO DATA01 BYTE ADDRESS
         S39W_COMMON1:
  45             JNB     DATA00_1,S39W_ISDONE      ;GO WRITE IS DONE ROUTINE
         S39W_COMMON2:
                 JNB     TALK_MODE,S39W_ISDONE     ;MAKE SURE TALK MODE IS SET
                 INC     R0                  ;GET THE BCLMODE BYTE ADDRESS
```

```
              MOVX    A,@R0               ;GET ITS CONTENT
              INC     R0                  ;GET THE DATA BYTE
              JB      ACC.2,S39_MBITSET   ;CHECK FOR MBIT SET
                      ;MBIT IS NOT SET
 5            MOVX    A,@R0               ;GET DATA BYTE
              CPL     A                   ;COMPLEMENT IT
              ANL     A,@R1               ;ANL WITH THE OLD DATA
              MOV     @R1,A               ;SAVE IT BACK
              jmp     msg_ret             ;return from message routine
10   S39_MBITSET:
              MOVX    A,@R0               ;GET DATA BYTE
              ORL     A,@R1               ;ANL WITH THE OLD DATA
              MOV     @R1,A               ;SAVE IT BACK
     S39W_ISDONE:
15            jmp     msg_ret             ;return from message routine
     S39W_ADDR4:
              MOV     R1,#DATA04          ;R1 POINTS TO DATA04 BYTE ADDRESS
              SJMP    S39W_COMMON2        ;GO FOR COMMON WRITE ROUTINE
          ;   AJMP    S39W_D04CH          ;GO FOR DATA04 CHECK ROUTINE 20   S39W_ADDR5:
              MOV     R1,#DATA05          ;R1 POINTS TO DATA05 BYTE ADDRESS
              SJMP    S39W_COMMON2        ;GO FOR COMMON WRITE ROUTINE
              jmp     msg_ret             ;return from message routine
     S39W_TADDR0:                         ;WRITE TO ADDRESS 00 ROUTINE
25            MOV     R0,#RBCLDTA
              MOVX    A,@R0
              MOV     R1,A                ;SAVE THE DATA IN R1 FOR LATER USE
              Jb      acc.7,S39W_HBITS
              JB      ACC.6,S39W_HBITS
30            JB      ACC.5,S39W_HBITS
              JB      ACC.4,S39W_HBITS
     S39W_LBITS:
              JBC     BKUP_MSGENA,S39W_DIALOG ;CHECK FOR BACKUP MESSAGE ENABLE
              JB      DATA00_1,S39W_DIALOG    ;CHECK FOR MESSAGE ENABLE
35                    ;COME HERE MESSAGE BIT IS NOT ENABLE
              MOV     A,R1                ;GET THE DATA BACK
              ANL     A,#02H              ;KEEP ONLY DATA00_0 BIT
     S39W_DIALOG:                         ;WRITE DIALOG BIT
              MOV     R1,A                ;LOAD THE READ DATA IN R1
40            DEC     R0                  ;GET BCLMODE BYTE ADDRESS
              MOVX    A,@R0               ;GET ITS CONTENTS
              MOV     R0,#DATA00          ;R0 POINT TO DATA00 BYTE ADDRESS
              JB      ACC.2,S39_MBITSET0  ;CHECK FOR MBIT IS SET
                      ;COME HERE MBIT IS NOT SET
45            JNB     DATA00_1,S39W_ISDONE    ;GO WRITE IS DONE ROUTINE
              MOV     A,R1                ;GET THE DATA BACK
              CPL     A                   ;COMPLEMENT IT
              ANL     A,@R0               ;AND WITH THE OLD DATA
```

```
                MOV     @R0,A                   ;SAVE IT BACK
                SJMP    S39_MFIXUP              ;GO TO MESSAGE FIXED UP
                                                ;COME HERE MBIT IS SET
        S39_MBITSET0:
  5             MOV     A,R1                    ;GET THE NEW DATA BACK
                JB      ACC.0,CLEAS39R_BIT_1    ;IF BIT 0 AND 1 ARE SET,1 MUST CLEAR
                SJMP    S39_MBITSET1            ;IF NOT,KEEP GOING
        CLEAS39R_BIT_1:
                CLR     DATA00_1                ;CLEAR BIT1,PROTOCOL REQUIRED
 10             CLR     ACC.1                   ;CLER ALSO COMMING BIT 1
                SETB    BKUP_MSGENA             ;SET UP BACK UP MESSAGE ENABLE
        S39_MBITSET1:
                ORL     A,@R0                   ;ORL WITH THE OLD DATA
                MOV     @R0,A                   ;SAVE IT BACK

15     S39_MFIXUP:
                MOV     A,#0C0H                 ;SET SERVICE AND BCL_ENA BIT TO 1
                MOV     C,DATA00_0              ;LOAD IMAGE OF SERVICE BIT IN CARRY
                MOV     ACC.7,C                 ;UPDATE SERVICE BIT
                MOV     BCLMODE,A               ;UPDATE INTERNAL BCLMODE BYTE
 20             MOV     R0,#WBCLMOD             ;POINT TO EXTERNAL BCL MODE BYTE ADDR
                MOVX    @R0,A                   ;GO AND UPDATE
                JB      DATA00_0,S39_RRET
                SETB    TALK_MODE
                MOV     R1,#12H                 ;R1 POINTS TO NEW CH A XMT SIG
 25             MOV     A,#0C0H                 ;SET UP A XMT SIG(COPY FROM ATT UNIT)
                MOVX    @R1,A                   ;SEND DEFAULT A XMT SIG
                INC     R1                      ;POINT TO CH B XMT SIG
                MOVX    @R1,A                   ; AND UPDATE IT TOO
                INC     R1                      ;POINT TO CH C XMT SIG
 30             MOVX    @R1,A                   ; AND UPDATE IT TOO
                INC     R1                      ;POINT TO CH D XMT SIG
                MOVX    @R1,A                   ; AND UPDATE IT TOO
        S39_RRET:
                jmp     msg_ret                 ;return from message routine
 35     S39_NOWRITE:
                JB      ACC.5,SS39_DATAOK       ;CHECK FOR CLEAR BIT 5
                JB      ACC.4,SS39_DATAOK       ;CHECK FOR CLEAR BIT 4
                jmp     msg_ret                 ;return from message routine
        S39W_HBITS:                             ;GO FOR WRITE HIGH BIT ROUTINE
 40             MOV     R2,A                    ;save data in r2
                MOV     R1,#DATA00              ;R1 POINTS TO DATA00 BYTE ADDRESS
                DEC     R0                      ;GET THE BCLMODE BYTE ADDRESS
                MOVX    A,@R0                   ;GET ITS CONTENT
                INC     R0                      ;GET THE DATA BYTE
 45             JB      ACC.2,S39_BITSET        ;CHECK FOR MBIT SET
                                                ;BITCLEAR ROUTINE
                                                ;FOR DATA00 BYTE :
                                                ;DATA00_7 : SET OR CLEAR DEPENDS ON TEST VOLTAGE(A SIDE)
```

```
            ;DATA00_6 : SET OR CLEAR DEPENDS ON TEST VOLTAGE(B SIDE)
            ;DATA00_5 : UNUSED,COULD BE WRITTEN BY BCU
            ;DATA00_4 : UNUSED,COULD BE WRITTEN BY BCU
            ;DATA00_3 : ALWAY LOW
            ;DATA00_2 : ALWAY LOW
            ;DATA00_1 : ALWAY LOW
            ;DATA00_0 : HIGH  FOR NEW CARD,LOW AFTER INITIALIZED
            ;
            ;THE FOLLOWING ROUTINE,JUST TO VERIFY WE WORK IDENTICAL
            ;TO WECO UNIT. IN REALITY,THIS BYTE WILL NOT WRITTEN
            ;BY THE BCU. THE CHANNEL UNIT IS RESPONSIBLE TO UPDATE
            ;THIS BYTE CORRECTLY,WHEN BCU POLLS FOR CHANNEL'S STATUS.

MOV   A,R2               ;LOAD THE DATA BACK
      JNB   ACC.7,S39_BCHECK       ;CHECK FOR CLEAR A OR B TEST BIT
      MOV   C,A_TEST_ON        ;LOAD CHANNEL TEST FLAG STATUS BIT
      ANL   C,DATA04_7         ;IN THE CARRY AND COMBINE WITH TEST
      JC    SS39_DATAOK        ;MASK BIT,IF BOTH OF SET,CLEAR IT
      JB    A_TEST_ON,S39_NOWRITE   ;OTHERWISE,IF TEST IS ON,DON'T DO IT
      JNB   DATA04_7,S39_NOWRITE    ;OR IF MASK IS SET,DON'T DO IT
      AJMP  SS39_DATAOK        ;IF BOTH OF THEM LOW,ALLOWING THE WRITE
            ;CHECK FOR CLEAR TEST B BIT
S39_BCHECK:
      MOV   C,B_TEST_ON        ;LOAD B CHANNEL TEST FLAG BIT IN CARRY
      ANL   C,DATA04_6         ;COMBINE WITH TEST MASK BIT
      JC    SS39_DATAOK        ;IF BOTH OF THEM IS SET,GO AND CLEAR IT
      JNB   ACC.6,S39_NOWRITE       ;IF NOT CLEAR BIT TEST B,DON'T DO IT
      JB    B_TEST_ON,S39_NOWRITE   ;IF,ONLY B TEST FLAG IS ON,DON'T DO IT
      JNB   DATA04_6,S39_NOWRITE    ;OR,IF ONLY MASK BIT ON,DON'T DO IT
            ;COME HERE BOTH TEST AND TEST MASK BIT IS LOW
            ;THIS CODE WILL UPDATA DATA00 BYTE.  AGAIN THIS
            ;BYTE WILL NOT UPDATE BY THE BCU.
SS39_DATAOK:
      MOV   A,R2               ;
      CPL   A                  ;COMPLEMENT IT
      ANL   A,@R1              ;ANL WITH THE OLD DATA
      MOV   @R1,A              ;SAVE IT BACK
      SJMP  S39_UPDBCL
S39_BITSET:                    ;BIT SET ROUTINE
      MOV   A,R2               ;GET DATA BYTE
      ORL   A,@R1              ;ANL WITH THE OLD DATA
      ANL   A,#0F2H            ;MASK BIT 2,3
      MOV   @R1,A              ;SAVE IT BACK
      SJMP  S39_UPDBCL
            ;DATA00 BIT 5,AND 4 ARE NOT USED FOR ANY PURPOSE, BUT
            ;DEBUGED PROTOCOL SHOW THAT BCU COULD WRITE TO IT.
            ;SO WE ALSO ALLOW TO UPDATA THESE BITS
S39_UPDBCL:
      MOV   A,DATA00           ;SET SERVICE AND BCL_ENA BIT TO 1
```

```
         ANL    A,#0F1H              ;KEEP ONLY MEANING BITS
         CLR    C                    ;IF ANY TEST ACTIVITY GOING ON
         JZ     S39_UPDBCL1             ;SET UP TO NSR BIT THE SAME(LOW)      SETB
     C                 ;OTHERWISE SET UP CLEAR IT
5    S39_UPDBCL1:
         MOV    A,BCLMODE            ;UPDATE INTERNAL BCLMODE BYTE
         ORL    C,DATA00_0           ;LOAD IMAGE OF SERVICE BIT IN CARRY
         MOV    ACC.7,C              ;UPDATE SERVICE BIT
         SETB   ACC.6                ;SET BCL_ENA
10       MOV    R0,#WBCLMOD          ;POINT TO EXTERNAL BCL MODE BYTE ADDR
         MOVX   @R0,A                ;GO AND UPDATE
         jmp    msg_ret              ;return from message routine
         END
```

A preferred embodiment of the present invention has been described herein. It is to be understood, of course, that changes and modifications may be made in the embodiment without departing from the true scope of the present invention, as defined by the appended claims.

We claim:

1. A provisioning channel card for a telecommunications interface, said telecommunications interface multiplexing digital data along a bus, said telecommunications interface including common equipment and a plurality of channel card slots for receiving channel cards, said telecommunications interface allocating a channel on said bus to a particular channel card only upon receiving an acknowledgement from said particular channel card in response to query from said common equipment, comprising, in combination:

a base for interconnecting to one of said channel card slots in said telecommunications interface;

acknowledgement means for receiving said query from said common equipment and responsively providing said acknowledgement to said common equipment; and advising means for advising at least one other of said channel cards that a channel on said bus allocated to said provisioning channel card usable by said one other of said channel card.

2. A provisioning channel card, as claimed in claim 1, wherein said telecommunications interface includes at least first and second other channel cards and said provisioning channel card, together with said first and second channel cards, comprises a tri-group of cards.

3. A provisioning card, as claimed in claim 2, wherein said first and second other channel cards transfer data formatted for an Integrated Services Digital Network and each requires B1, B2, and D service.

4. A provisioning channel card for a telecommunications interface, said telecommunications interface multiplexing digital data along a bus, said telecommunications interface including common equipment and at least three channel unit card slots for receiving at least first and second channel cards and said provisioning channel card, said telecommunications interface allocating a channel on said bus to a particular channel card only upon receiving an acknowledgement from said particular channel card in response to a query from said common equipment, said first and second channel cards providing Integrated Services Digital Network service and requiring B1, B2, and D+, said common equipment allocating a payload channel to each of said channel cards and said payload channel comprising two 8-bit segments, said provisioning channel card comprising in combination:

a base for interconnecting to one of said channel card slots in said telecommunications interface;

acknowledgement means for receiving said query from said common equipment and responsively providing said acknowledgement to said common control; and advising means for advising said first and second channel cards that said two 8-bit segments allocated by said common equipment to said provisioning channel card may be utilized by said other channel cards, wherein said first channel card utilizes two segments allocated to said first channel card and one of said segments allocated to said second channel card, said second channel card utilizes one of said segments allocated to said second channel card and two of said segments allocated to said provisioning channel card, and said provisioning channel card substantially provides no payload to said bus.

5. A telecommunications interface for multiplexing digital data along a bus, comprising, in combination:

a plurality of channel card slots for receiving channel cards;

at least one channel card for payload interconnected to one of said channel card slots;

a provisioning channel card for interconnecting to one of said channel card slots;

a common control for issuing a query to said channel cards and allocating a channel on said bus to a particular channel card only upon receiving an acknowledgement from said particular channel card in response to said query;

acknowledgement means, on said provisioning channel card, for receiving said query from said common control and responsively providing said acknowledgement to said common control; and advising means, on said provisioning channel card, for advising said one channel card for payload that a channel on said bus allocated to said provisioning card is usable by said one channel card for payload.

* * * * *